US012784440B2

(12) United States Patent
Simonelli et al.

(10) Patent No.: US 12,784,440 B2
(45) Date of Patent: Nov. 3, 2026

(54) IMAGE ANALYSIS SYSTEMS AND METHODS FOR DETERMINING BUILDING FOOTPRINT

(71) Applicant: Betterview Marketplace, Inc., San Francisco, CA (US)

(72) Inventors: Julius Simonelli, San Diego, CA (US); Ilsoo Seong, Aliso Viejo, CA (US); Jason Janofsky, San Marcos, CA (US); Nicholas Molyneux, San Diego, CA (US); David Tobias, Burlingame, CA (US); David Lyman, Houston, TX (US); Peter Tran, San Diego, CA (US); Hiroshi Kobayashi, Mission Viejo, CA (US)

(73) Assignee: NEARMAP US, INC., Lehi, UT (US)

( * ) Notice: Subject to any disclaimer, the term of this patent is extended or adjusted under 35 U.S.C. 154(b) by 305 days.

(21) Appl. No.: 18/491,397

(22) Filed: Oct. 20, 2023

(65) Prior Publication Data

US 2025/0131710 A1 Apr. 24, 2025

(51) Int. Cl.
*G06V 20/10* (2022.01)
*G06T 3/20* (2006.01)
(Continued)

(52) U.S. Cl.
CPC .............. *G06V 20/176* (2022.01); *G06T 3/20* (2013.01); *G06T 3/60* (2013.01); *G06T 7/33* (2017.01);
(Continued)

(58) Field of Classification Search
CPC .. G06V 20/176; G06V 20/188; G06V 10/764; G06T 3/20; G06T 3/60;
(Continued)

(56) References Cited

U.S. PATENT DOCUMENTS 9,152,863 B1 10/2015 Grant
10,529,029 B2 1/2020 Okazaki
(Continued)

OTHER PUBLICATIONS

Wang, Fan, "Understanding High Resolution Aerial Imagery Using Computer Vision Techniques." Chester F. Carloson Center for Imaging Science College of Science. Aug. 2017. https://home.cis.rit.edu/~cnspci/references/theses/phd/wang2017.pdf.

*Primary Examiner* — Michael Le
(74) *Attorney, Agent, or Firm* — Ruggiero McAllister & McMahon LLC

(57) ABSTRACT

Methods, non-transitory computer readable media, and building analysis systems are disclosed that analyze an overhead image to generate a building outline for a building associated with a property represented by the overhead image. The overhead image is included in imagery data obtained from an overhead imagery server based on a received request comprising a geographic location for the property. The building outline is then shifted or rotated. Segment(s) of the building outline are slid to match identified wall(s) of the building. The building outline is then modified based on property feature(s) detected based on an application of one or more trained machine learning classifiers to the overhead image. At least a portion of the overhead image is output with a graphical overlay comprising the building outline via a user interface in response to the received request.

20 Claims, 5 Drawing Sheets

(51) Int. Cl.

| | |
|---|---|
| ***G06T 3/60*** | (2024.01) |
| ***G06T 7/33*** | (2017.01) |
| ***G06T 7/73*** | (2017.01) |
| ***G06T 11/23*** | (2026.01) |

(52) U.S. Cl.
CPC ................ *G06T 7/73* (2017.01); *G06T 11/23* (2026.01); *G06V 20/188* (2022.01); *G06T 2207/10032* (2013.01); *G06T 2207/20081* (2013.01)

(58) Field of Classification Search
CPC . G06T 7/33; G06T 7/73; G06T 11/203; G06T 2207/10032; G06T 2207/20081
See application file for complete search history.

(56) References Cited

U.S. PATENT DOCUMENTS

| | | | | |
|---|---|---|---|---|
| 10,572,948 | B1 | 2/2020 | Cook et al. | |
| 10,650,285 | B1 | 5/2020 | Okazaki | |
| 10,949,930 | B1 | 3/2021 | Tofte et al. | |
| 11,030,491 | B2 | 6/2021 | Okazaki | |
| 11,151,378 | B2 | 10/2021 | Kottenstette et al. | |
| 11,195,058 | B2 | 12/2021 | Okazaki | |
| 11,308,714 | B1 * | 4/2022 | Christoudias | G06F 17/15 |
| 11,347,976 | B2 | 5/2022 | Okazaki | |
| 11,551,040 | B2 | 1/2023 | Okazaki | |
| 11,687,768 | B2 | 6/2023 | Okazaki | |
| 11,971,871 | B1 * | 4/2024 | Kienle | G06Q 50/16 |
| 2012/0096352 | A1 * | 4/2012 | Maor | A63F 13/12 715/706 |
| 2019/0066322 | A1 * | 2/2019 | Mishra | G06T 7/62 |
| 2019/0205287 | A1 | 7/2019 | Emison et al. | |
| 2021/0073692 | A1 * | 3/2021 | Saha | G06Q 10/06316 |
| 2023/0032888 | A1 * | 2/2023 | Li | G06T 7/74 |
| 2023/0147587 | A1 * | 5/2023 | Meier | G01C 11/02 348/222.1 |
| 2023/0281447 | A1 * | 9/2023 | Okazaki | G06F 18/241 382/224 |
| 2023/0360296 | A1 * | 11/2023 | Çetintas | G06F 30/12 |
| 2024/0029352 | A1 * | 1/2024 | Wan | G06T 7/12 |

* cited by examiner

IMAGE ANALYSIS SYSTEMS AND METHODS FOR DETERMINING BUILDING FOOTPRINT

FIELD

The disclosed technology generally relates to image analysis systems and methods for determining building footprint and, more particularly, to systems and methods that apply deep learning algorithms to overhead imagery and other contextual data to generate more accurate and consistent building footprint data representations.

BACKGROUND

Building footprint data can be utilized across various industries and applications, such as property and casualty insurance, urban planning, infrastructure development, emergency response planning, environmental impact assessments, property management, and real estate development, for example. With the increased availability of overhead imagery, automated technical solutions for determining building footprint have been developed that improve scalability and are relatively cost-effective. However, these methods suffer from several shortcomings including misalignment, inconsistency, inaccurate representation of building structures, lack of adaptability to structural changes, and the need for manual post-processing.

More specifically, building footprints obtained or generated from one imagery source tend to be misaligned with other imagery sources, which leads to inaccurate spatial data representation. The quality of building footprints varies depending on the source of the footprints, and/or imagery from which the footprints are generated, which also results in inconsistent spatial data representation across different regions or properties. Moreover, many current techniques for determining building footprints also rely on historical data that may be out of date or inconsistent with current overhead imagery.

Current building footprint analysis techniques have limited accuracy and reliability even when not affected by issues related to misalignment and inconsistent data. For example, semantic segmentation is a common approach for determining building footprints today, but this approach often yields building outlines with irregular or imprecise lines that do not accurately represent the straight edges and other contours of building structures. The performance of current building footprint analysis systems is also heavily influenced by the quality of input data, such as the resolution of the overhead imagery, limiting their effectiveness.

SUMMARY

Described herein are systems and methods for applying deep learning and refinement algorithms and techniques, such as property shift, building shift and rotation, wall sliding, and building addition, replacement, and removal to provide accurate alignment, consistency, visually appealing building footprints, adaptability to structural changes, and the elimination of manual post-processing. Thus, the disclosed technology addresses the need for a more reliable and accurate method to estimate building footprint by providing methods and systems that leverage deep learning algorithms applied to overhead imagery and other contextual data to derive a more precise and objective estimation of building footprint.

In one embodiment, the present disclosure is directed to a method that is implemented by a building analysis system and includes analyzing an overhead image with a first trained machine learning classifier to generate a first building outline for a first building associated with a property represented by the overhead image. The overhead image is included in imagery data obtained from an overhead imagery server based on a received request comprising a geographic location for the property. The first building outline is shifted or rotated. One or more segments of the first building outline are slid to match one or more identified walls of the first building. The first building outline is modified based on one or more property features detected based on an application of a second trained machine learning classifier to the overhead image. At least a portion of the overhead image is then output with a graphical overlay comprising the first building outline via a user interface in response to the received request.

In some examples, the method further includes shifting or rotating the overhead image based on a determined centroid of each of the first building outline and a second building outline obtained for the first building from a footprint server based on the geographic location. In these examples, the first building outline can be generated to have a shape and a location within the overhead image. The shape can be determined based on another shape of the second building outline and the location can be determined based on pixels of the overhead image determined to correspond to the first building based on the analysis of the overhead image. Optionally, in these examples, the first building outline can be one or more of shifted or rotated to a location within the overhead image that results in a maximum intersection-over-union value determined based on the first and second building outlines.

In other examples, the method includes analyzing the overhead image to identify locations of multiple buildings. Multiple building outlines associated with the property are obtained from a footprint server based on the geographic location. A determination is then made whether to generate the first building outline using one of the building outlines based on a comparison of the building outlines to the locations of the buildings within the overhead image. In yet other examples, the overhead image can be analyzed to generate a second building outline for a second building associated with the property. In these examples, the shifting or rotating of the first building outline can be independent of the second building outline.

In further examples, the method can include determining based on the property features whether to retain the first building outline. The property features can comprise yard debris or structural damage. In other examples, the first building outline can be generated based in part on an estimation of a location of a portion of the first building determined to be blocked by vegetation overhang based on the analysis of the overhead image. In these examples, the first building outline can comprise a polygon and the simplification algorithm can be applied to one or more portions of the polygon before outputting the portion of the overhead image with the graphical overlay comprising the first building outline. At least one of the portions of the polygon in these examples can correspond to the portion of the first building determined to be blocked by vegetation overhang.

In another embodiment, a building analysis system is disclosed that includes memory having instructions stored thereon and one or more processors coupled to the memory and configured to execute the stored instructions to analyze an overhead image with a first trained machine learning classifier to generate a first building outline for a first building associated with a property represented by the overhead image. The overhead image is included in imagery data obtained from an overhead imagery server based on a received request comprising a geographic location for the property. The first building outline is then shifted or rotated based on a determined centroid of each of the first building outline and a second building outline obtained for the first building from a footprint server based on the geographic location. The first building outline is shifted or rotated independent of a third building outline for a third building associated with the property and obtained from the footprint server based on the geographic location. One or more segments of the first building outline are slid to match one or more walls of the first building identified during the analysis of the overhead image. The first building outline is modified based on one or more property features detected based on an application of a second trained machine learning classifier to the overhead image. At least a portion of the overhead image with a graphical overlay comprising at least the first building outline is then output via a user interface in response to the received request.

In some examples, the processors are further configured to execute the stored instructions to generate the first building outline to have a shape and a location within the overhead image. In these examples, the shape can be determined based on another shape of the second building outline and the location is determined based on pixels of the overhead image determined to correspond to the first building based on the analysis of the overhead image. In yet other examples, the processors are further configured to execute the stored instructions to one or more of shift or rotate the first building outline to a location within the overhead image determined based on an intersection-over-union value generated based on the first and second building outlines.

In further examples, the processors are further configured to execute the stored instructions to determine based on the property features whether to include the first building outline in, or exclude the first building outline from, the graphical overlay. The property features in these examples can comprise yard debris or structural damage. Additionally, the processors in other examples are further configured to execute the stored instructions to generate the first building outline based in part on an estimation of a location of a portion of the first building determined to be blocked by vegetation overhang based on the analysis of the overhead image.

The processors can be further configured to execute the stored instructions to simplify one or more portions of the first building outline before outputting the portion of the overhead image with the graphical overlay comprising the first building outline. At least one of the portions of the first building outline can correspond to the portion of the first building determined to be blocked by vegetation overhang.

In yet another embodiment, a non-transitory computer readable medium is disclosed that has stored thereon instructions comprising executable code that, when executed by one or more processors, causes the processors to analyze an overhead image to generate a first building outline for a first building associated with a property represented by the overhead image. The overhead image is included in imagery data obtained from an overhead imagery server based on a received request comprising a geographic location for the property. A second building outline for the first building and a third building outline for a second building associated with the property are obtained from a footprint server based on the geographic location. The first building outline is then adjusted based in part on the second building outline. The first building outline is adjusted independently of the third building outline. A position of one or more segments of the first building outline is modified to match one or more walls of the first building identified during the analysis of the overhead image. The overhead image with a graphical overlay comprising at least the first building outline is then output via a user interface in response to the received request.

In some examples, the executable code, when executed by the processors, further causes the processors to generate the first building outline to have a shape and a location within the overhead image. The shape can be determined based on another shape of the second building outline and the location can be determined based on pixels of the overhead image determined to correspond to the first building based on the analysis of the overhead image.

In other examples, the executable code, when executed by the processors, further causes the processors to modify the first building outline based on one or more property features detected based on an application of one or more trained machine learning classifiers to the overhead image before the overhead image is output. In these examples, the executable code, when executed by the processors, can further cause the processors to determine based on the property features whether to retain the first building outline. Additionally, in these examples, the executable code, when executed by the processors, can further cause the processors to determine based on the property features whether to include the first building outline in, or exclude the first building outline from, the graphical overlay.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

This disclosure is not limited to the particular systems, devices and methods described, as these may vary. The terminology used in the description is for the purpose of describing the particular versions or embodiments only and is not intended to limit the scope.

Figure 1:
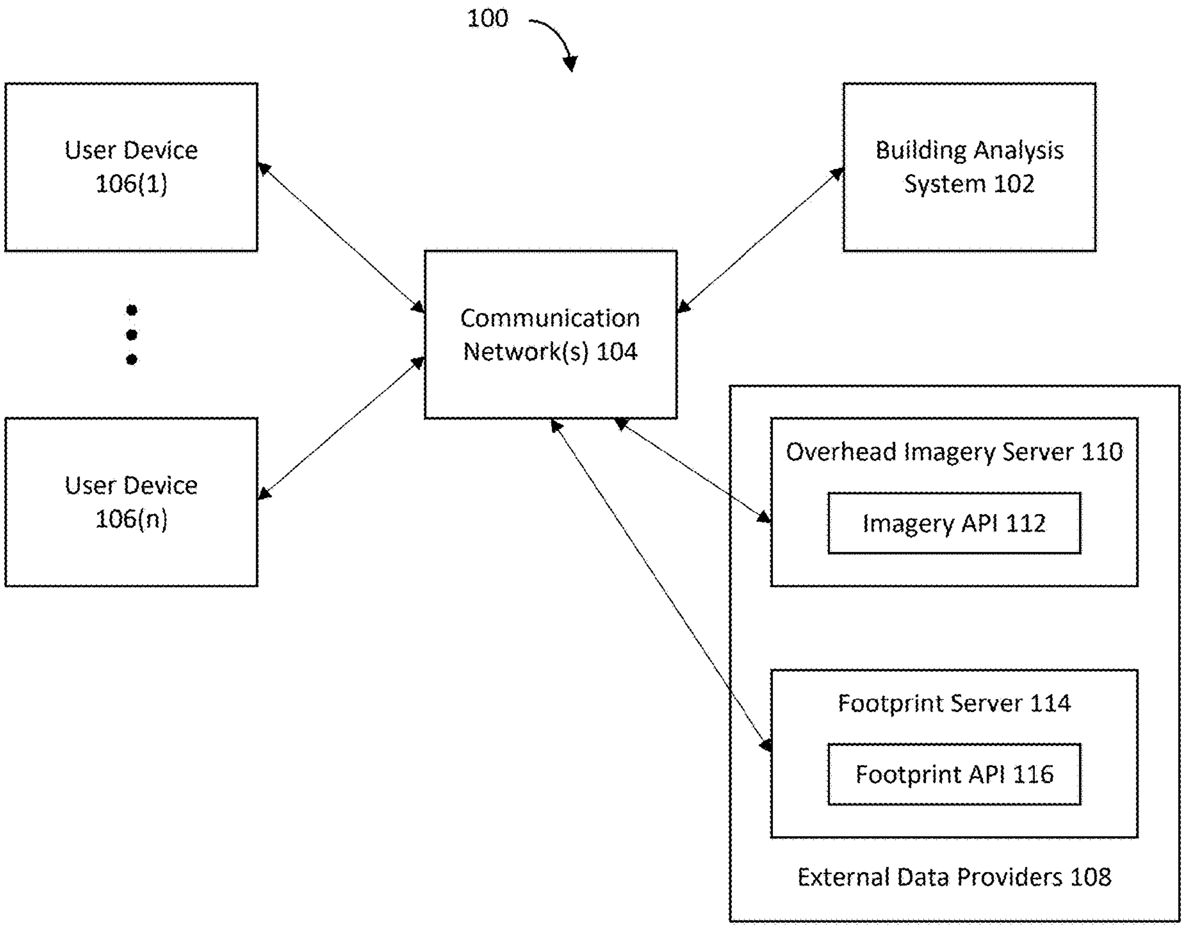
FIG. 1 is a block diagram of an exemplary network environment with a building analysis system.

Referring to FIG. 1, an exemplary network environment 100 is illustrated that includes a building analysis system 102, which is coupled via communication network(s) 104 to user devices 106(1)-**106(*n*) and external data providers 108, which in this example include an overhead imagery server 110 hosting an imagery API 112 and a footprint server 114** hosting a footprint API 116, although other external data providers can also be included in the network environment in other examples. The network environment 100 may include other network devices such as one or more routers or switches, for example, which are known in the art and thus will not be described herein.

In this example, the building analysis system 102, user devices 106(1)-**106(*n*), overhead imagery server 110, and footprint server 114, are disclosed in FIG. 1 as dedicated hardware devices. However, one or more of the building analysis system 102, user devices 106(1)-106(*n*), overhead imagery server 110, or footprint server 114 can also be implemented in software within one or more other devices in the network environment 100. As one example, the building analysis system 102, as well as any of its components or applications, can be implemented as software executing on the overhead imagery server 110**, and many other permutations and types of implementations and network topologies can also be used in other examples.

Figure 2:
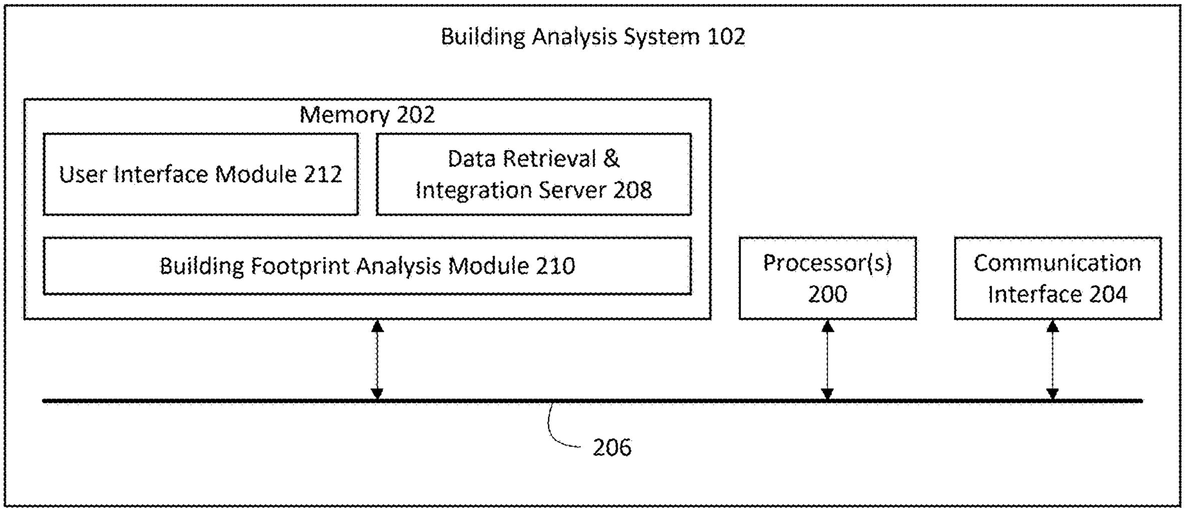
FIG. 2 is a block diagram of an exemplary building analysis system.

Referring to FIGS. 1-2, the building analysis system 102 may perform any number of functions, including image analysis, image preprocessing, applying machine learning models, and providing GUIs to the user devices 106(1)-**106(*n*), among other functions as described in detail below. The building analysis system 102 in this example includes processor(s) 200, memory 202, and a communication interface 204, which are coupled together by a bus 206, although the building analysis system 102** can include other types or numbers of elements in other configurations.

The processor(s) 200 of the building analysis system 102 may execute programmed instructions stored in the memory 202 of the building analysis system 102 for any number of the functions described herein. The processor(s) 200 may include one or more processing cores, one or more central processing units, and/or one or more graphics processing units, for example, although other types of processor(s) can also be used.

The memory 202 stores these programmed instructions for one or more aspects of the present technology as described herein, although some or all of the programmed instructions could be stored elsewhere. A variety of different types of memory storage devices, such as random-access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 can store applications that can include computer executable instructions that, when executed by the processor(s) 200, cause the building analysis system 102 to perform actions, such as to transmit, receive, or otherwise process network messages and requests and generate graphical interfaces and displays, for example, and to perform other actions described herein. The application(s) can be implemented as components of other applications, operating system extensions, and/or plugins, for example.

Further, the application(s) may be operative in a cloud-based computing environment with access provided via a software-as-a-service (SaaS) model. The application(s) can be executed within or as virtual machine(s) or virtual server(s) that may be managed in a cloud-based computing environment. Also, the application(s), and even the building analysis system 102 itself, may be located in virtual server(s) running in a cloud-based computing environment rather than being tied to specific physical network computing devices.

In some examples, the memory 202 includes a data retrieval and integration server 208, a building footprint analysis module 210, and a user interface module 212, although other modules can also be used in other examples. The data retrieval and integration server 208 is configured to obtain overhead imagery data, including overhead images, from the overhead imagery server 110 via the imagery API 112 and footprint data, including building outlines, from the footprint server 114 via the footprint API 116.

The building footprint analysis module 210 generally obtains the overhead imagery and footprint data and analyzes the data to generate graphical building outlines corresponding to building footprints (interchangeably referred to herein as building outlines) in the overhead images. In some examples, the building footprint analysis module 210 generates building outlines for identified sets of pixels that are associated with buildings represented in the imagery data. The generated building outlines can be adjusted based on a shape of the obtained building outlines extracted from the footprint data. The building footprint analysis module 210 then performs a property-level shift by translating or rotating the building outlines to more closely align the represented buildings to the resulting building outlines.

Next, the building footprint analysis module 210 can perform building-level adjustments by shifting or rotating one or more of the building outlines independently from other building outlines. Fine-tuning can be performed by sliding particular segments of the building outlines to more closely align with identified walls of the buildings. Additionally, building outlines can be added, replaced, or removed based on buildings represented in the footprint data but not present on the most-recent overhead images. Finally, the building footprint analysis module 210 can perform a building cleanup (e.g., based on a simplification algorithm) and apply a machine learning classifier to identify property features, such as yard debris and structural damage. Subsequent building additions or removals can be performed based on the impact of the property features on the building outlines. The operation of the building footprint analysis module 210 will be described in more detail below with reference to FIGS. 3-5.

The user interface module 212 is configured to obtain from the user devices 106(1)-**106(*n*) the input geographical information (e.g., an address or geographic coordinates). Additionally, the user interface module 212** generates interactive GUIs that graphically reflect the generated building outlines (e.g., via overlays).

The communication interface 204 of the building analysis system 102 operatively couples and communicates between the building analysis system 102, user devices 106(1)-**106(*n*), overhead imagery server 110, and footprint server 114, which are coupled together at least in part by the communication network(s) 104 in this particular example, although other types or numbers of communication networks or systems with other types or numbers of connections or configurations to other devices or elements can also be used. The communication network(s) 104 can include wide area network(s) (WAN(s)) and/or local area network(s) (LAN(s)), for example, and can use TCP/IP over Ethernet and industry-standard protocols, although other types or numbers of protocols or communication networks can be used. The communication network(s) 104** can employ any suitable interface mechanisms and network communication technologies including, for example, Ethernet-based Packet Data Networks (PDNs).

The building analysis system 102 in some examples can include multiple devices each having one or more processors (each processor with one or more processing cores) that implement one or more steps of this technology. In these examples, one or more of the devices can have a dedicated communication interface or memory. Alternatively, one or more of the devices can utilize the memory 202, communication interface 204, or other hardware or software components of one or more other devices included in the building analysis system 102. Additionally, one or more of the devices that together comprise the building analysis system 102 in other examples can be standalone devices or integrated with one or more other devices or apparatuses.

The overhead imagery server 110 can include processor(s), memory, and a communication interface, which are coupled together by a bus or other communication link (not illustrated), although other numbers or types of components could also be used. The overhead imagery server 110 can store a database or other data structure that includes overhead images correlated with temporal data associated with the capture or acquisition of the overhead images. The overhead images can be images captured by a drone, aircraft, satellite, high-altitude balloon, or any other source of overhead or aerial images (commonly referred to herein as "overhead images") and the overhead imagery server 110 can publish an imagery API 112 to facilitate access to the stored imagery data. Accordingly, the overhead imagery server 110 can provide an API endpoint, for example, configured to intake prospective requests with particular criteria from the building analysis system 102 and return imagery data including an indication of available imagery dates, overhead images, and corresponding temporal data.

The footprint server 114 also can include processor(s), memory, and a communication interface, which are coupled together by a bus or other communication link (not illustrated), although other numbers or types of components could also be used. The footprint server 114 can host databases and modules configured to resolve geographic information included in footprint requests to particular properties and provide footprint data including building outlines for the properties as a result. Accordingly, the footprint server 114 can provide the footprint API 116 configured to intake geographic information and return footprint data.

In some examples, the footprint server 114 can be provided by ONEGEO GmbH of Berlin, Germany and, in other examples, the footprint server 114 can be hosted by Microsoft Corporation of Redmond, Washington via its Bing Maps™ platform. Each of the overhead imagery server 110 and footprint server 114 can facilitate other functionality in other examples, and other external data providers 108 can also be provided in the network environment 100.

Each of the user devices 106(1)-**106(*n*) of the network environment 100 in this example includes any type of computing device that can exchange network data, such as mobile, desktop, laptop, or tablet computing devices. Each of the user devices 106(1)-106(*n*) includes processor(s), memory, and a communication interface, which are coupled together by a bus or other communication link (not illustrated), although other numbers or types of components could also be used. Each of the user devices 106(1)-106(*n*) may run interface applications, such as web browsers or standalone applications, which may provide an interface to communicate with the building analysis system 102 via the communication network(s) 104. Each of the user devices 106(1)-106(*n*)** may further include a display device, such as a display screen or touchscreen, or an input device, such as a keyboard or mouse, for example (not shown).

Although the exemplary network environment 100 with the building analysis system 102, user devices 106(1)-**110(*n*), overhead imagery server 110, footprint server 114, and communication network(s) 104** is described herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the building analysis system 102, user devices 106(1)-**110(*n*), overhead imagery server 110, or footprint server 114, for example, may be configured to operate as virtual instances on the same physical machine. In other words, one or more of the building analysis system 102, user devices 106(1)-110(*n*), overhead imagery server 110, or footprint server 114 may operate on the same physical device rather than as separate devices communicating through the communication network(s) 104. Additionally, there may be more or fewer building analysis systems, user devices, overhead imagery servers, or footprint servers than illustrated in FIG. 1**.

The examples of this technology may also be embodied as one or more non-transitory computer readable media having instructions stored thereon, such as in the memory 202 of the building analysis system 102, for one or more aspects of the present technology, as described and illustrated by way of the examples herein. The instructions in some examples include executable code that, when executed by one or more processors, such as the processor(s) 200 of the building analysis system 102, cause the processors to carry out steps necessary to implement the methods of the examples of this technology that will now be described herein.

Figure 3:
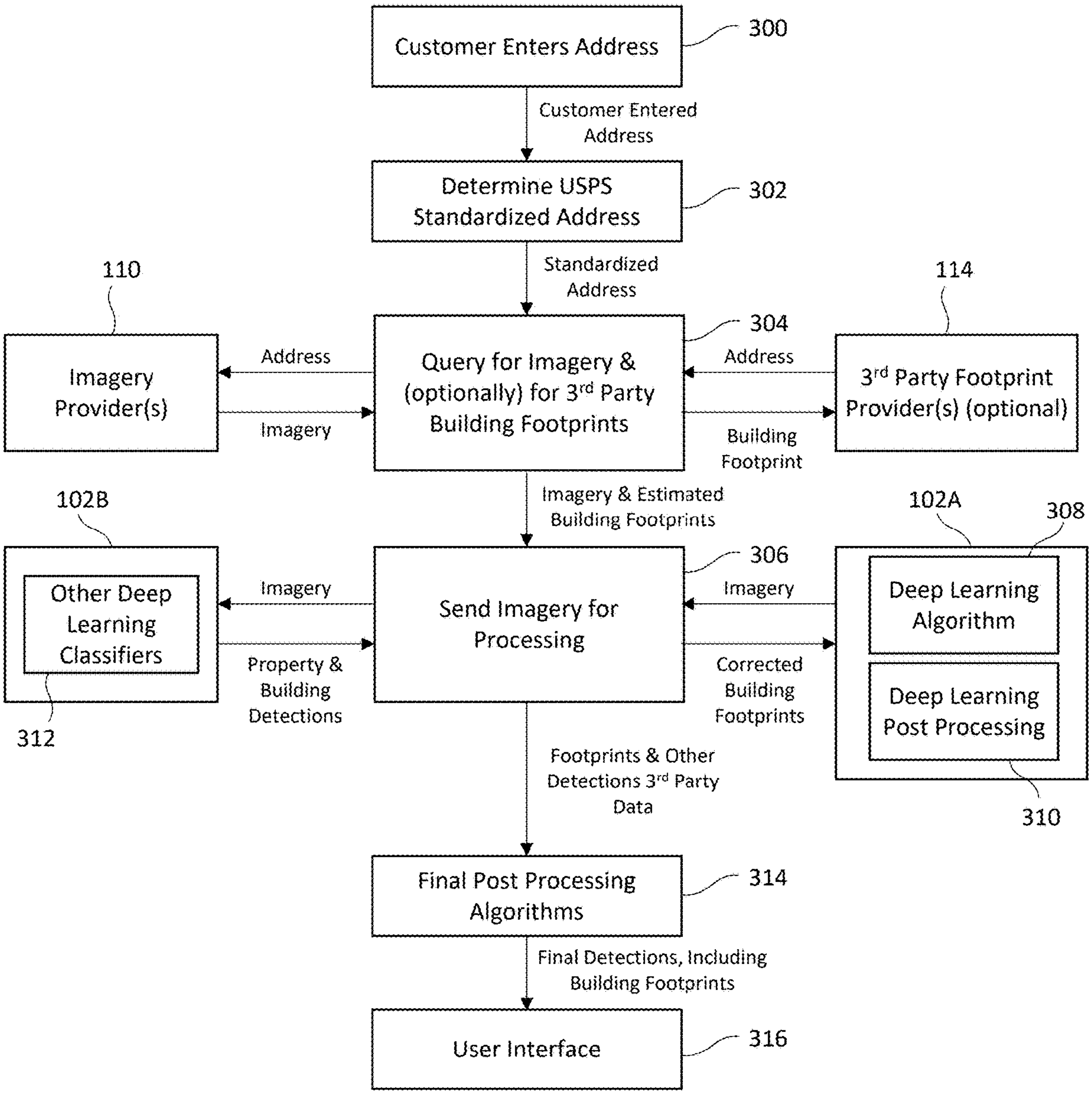
FIG. 3 is a flow diagram of an exemplary method for determining a building footprint.

Referring now to FIG. 3, a flow diagram of an exemplary method for determining a building footprint is illustrated. In step 300 in this example, the building analysis system 102 receives a footprint request via a graphical user interface (GUI) provided to one of the user devices 106(1)-**106(*n*)**, for example. The footprint request can include geographic information relating to a property of interest with respect to the footprint of any number of buildings located therein. For example, the footprint request can include a geographic location such as an address or geographic coordinates (e.g., latitude and longitude), associated with the property of interest.

In step 302, the building analysis system 102 validates the input geographic location to ensure it is in a correct format and/or within an expected range for valid properties and resolves the geographic information to a precise property location. Optionally, the building analysis system 102 interfaces with an external data provider 108, such as a maps platform server, to identify the correct property based on the input geographic location. For example, the building analysis system 102 can match the input geographic location against an address database (e.g., to obtain a U.S. Postal Service standardized formal address) or communicate with a maps platform server via a maps API to perform a reverse geocoding of geographic coordinates to obtain an address, when the address is not provided by the input geographic location, and other property resolution techniques can also be used in other examples.

In step 304, the building analysis system 102 obtains from the overhead imagery server 110, and via the imagery API 112 or other data exchange protocol, imagery data, including historical overhead image(s) associated with the property location. In some examples, the building analysis system 102 determines a parcel bounding box for the parcel corresponding to the property of interest. In some examples, the building analysis system 102 retrieves the parcel boundary from one of the external data providers 108, such as the overhead imagery server 110 or another property database or Geographic Information System (GIS) system, for example. The overhead imagery server 110 can return the relevant overhead images in any digital format, such as GeoTIFF, JPEG, and/or PNG, for example.

Optionally, the building analysis system 102 also obtains in step 304 footprint data including building footprint(s) or outline(s) associated with the property from the footprint server 114, and via the footprint API 116 or other data exchange protocol. In these examples, the building analysis system 102 queries third-party building footprint provider(s) for their estimated building footprints.

In step 306, the building analysis system 102 sends the overhead imagery for processing. In one example, the overhead images are encoded (e.g., as a serialized binary format or JSON format) to an internal worker module (e.g., from the data retrieval and integration server 208) via a message queue or any other inter-process communication mechanism, for example. In some examples, the building analysis system 102 preprocesses the obtained overhead images to enhance, normalize, crop, and/or align the overhead images, for example, prior to sending the overhead images for processing.

For example, the overhead imagery, property boundaries, and/or building footprints may not all be aligned in the various overhead images. Thus, the building analysis system 102 can align the overhead images so that the overhead images are properly registered with each other. In other examples, the preprocessing performed by the building analysis system 102 can include cropping the overhead images to a dilated and expanded representation of a property boundary to focus on the area of interest and reduce computational complexity. The cropping can be performed by the building analysis system 102 using a predefined template or by leveraging property boundary or other data obtained from an external data provider 108, for example.

In yet other examples, the building analysis system 102 can perform color space transformation(s), image enhancement(s) (e.g., edge detections, sharpening, and/or noise reduction), histogram equalization, or any other computer vision preprocessing technique. For example, the building analysis system 102 can apply image enhancement technique(s) to improve the visibility of features and patterns in the overhead images.

Additionally, the building analysis system 102 can perform one or more normalizing, resizing, or resampling operations to preprocess the overhead images. For example, the building analysis system 102 can normalize the overhead images to account for differences in lighting conditions, image sensor characteristics of capture devices, and/or other factors that may affect image quality. The normalization can be performed by the building analysis system 102 by applying histogram equalization, adaptive histogram equalization, and/or other normalization technique(s) to ensure or improve consistency across the overhead images. Other types and/or another number of preprocessing techniques can also be applied by the building analysis system 102 to one or more of the overhead images in other examples.

In step 308, the building analysis system 102 analyzes the overhead images to identify locations of building(s) represented therein by applying a deep learning algorithm to generate an initial approximation of building outlines. In some examples, one or more of the building outlines can be generated to have a shape determined based on the shape of the corresponding building outlines obtained in step 304 from the footprint server 114. The deep learning algorithm can be, or can include, a semantic segmentation algorithm and/or a machine learning model (e.g., a convolutional neural network (CNN)) that is trained to identify sets of pixels that correspond to respective buildings, although other types of deep learning algorithms can be used.

Accordingly, in these examples, the location of the generated building outlines within the overhead images can be determined based on pixels of the overhead images determined to correspond to the buildings based on the analysis of the overhead images and application of the deep learning model. In yet other examples, one or more segments of one or more of the building outlines can be generated based on a projection or estimation of a location of the associated building that is determined based on the analysis of the overhead images to be blocked (e.g., by vegetation overhang).

Figure 4:
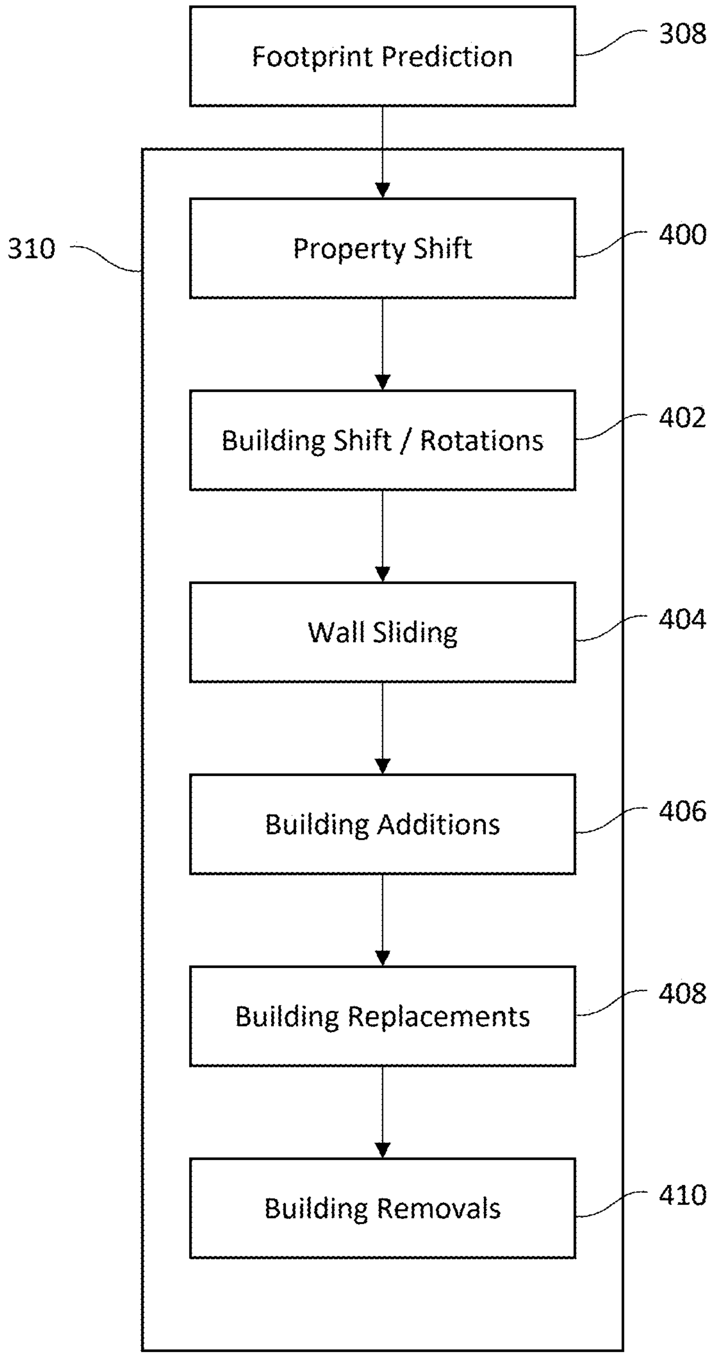
FIG. 4 is a flowchart of an exemplary method for an initial post-processing after analyzing obtained overhead images to identify buildings and generate predicted building outlines.

In step 310, the building analysis system 102 initiates an initial post-processing algorithm to refine and improve the accuracy of the generated building outlines, which will now be described in more detail. Referring to FIG. 4, a flowchart of an exemplary method for an initial post-processing after analyzing obtained overhead images to identify buildings and generate predicted building outlines is illustrated. In step 400 in this example, the building analysis system 102 shifts (e.g., translates) and/or rotates the building outlines to align the building outlines more accurately with the identified buildings. In one example, the building analysis system 102 determines a centroid of each of the building outlines obtained from the footprint server 114 and the outlines generated in step 308 for the corresponding buildings to adjust those generated outlines, although other methods for implementing the property-level shift of step 400 can also be used in other examples.

In step 402, the building analysis system 102 shifts (e.g., translates) and/or rotates one or more of the generated building outlines for one or more of the buildings independently from the other generated building outlines for the other buildings. In one example, the one or more of the building outlines are shifted and/or rotated to a location within the overhead images that results in a maximum intersection-over-union (IOU) value determined based on the outlines obtained from the footprint server 114 and generated in step 308. Thus, the shifting or rotating of each generated building outline is independent of any building outlines generated for other buildings. The generated building outlines resulting from step 402 adjust the position and orientation of the building outlines to thereby enhance the associated spatial data representation.

In step 404, the building analysis system 102 slides (e.g., shifts and/or rotates) one or more segments of one or more of the building outlines to match one or more identified walls of the corresponding buildings to refine the generated building outlines. Accordingly, segments or portions of the generated building outlines can be slid in step 402 to better match the actual building structures (e.g., walls) identified in the overhead imagery, resulting in more accurate and visually appealing building footprints.

In steps 406-408, the building analysis system 102 identifies building additions, replacements, and/or removals, respectively. In some examples, the initial deep learning algorithm recommends buildings to add, replace, or remove from the footprint data obtained from the footprint server 114, which ensures that the historical footprint data is updated to include all the appropriate buildings and exclude any removed ones. For example, the obtained footprint data may be historically dated such that a building outline for a new building constructed on the property after the footprint data was captured or generated is not reflected in that footprint data, in which case the building analysis system 102 may decide to add the outline for that building in step 406.

Accordingly, the building analysis system 102 effectively determines whether to generate or include/exclude the generated building outlines resulting from the adjustments in steps 400-404 for the subsequent post-processing step 310 based on a comparison of the building outlines obtained from the footprint server 114 to the locations of the buildings identified within the overhead images. Thus, the two sets of building footprints (i.e., as obtained from the footprint server 114 and as generated in step 308) in some examples serve as the basis for subsequent alignment and refinement in post-processing step 310. Combining these two datapoints yields improved building outlines with increased accuracy with respect to shape and location within the overhead images.

Referring back to FIG. 3, in step 312, the building analysis system 102 optionally utilizes deep learning classifiers, such as machine learning models that are trained and configured to analyze overhead imagery to identify property features, such as yard debris or structural damages. The deep learning classifiers utilized in step 312 can be used as described and illustrated in more detail below with reference to steps 502-504 of FIG. 5, for example. While steps 308-310 and step 312 are illustrated in FIG. 3 as performed by separate building analysis systems 102A and 102B, respectively, steps 308-10 and 312 can be performed by the same building analysis system 102 in other examples.

Figure 5:
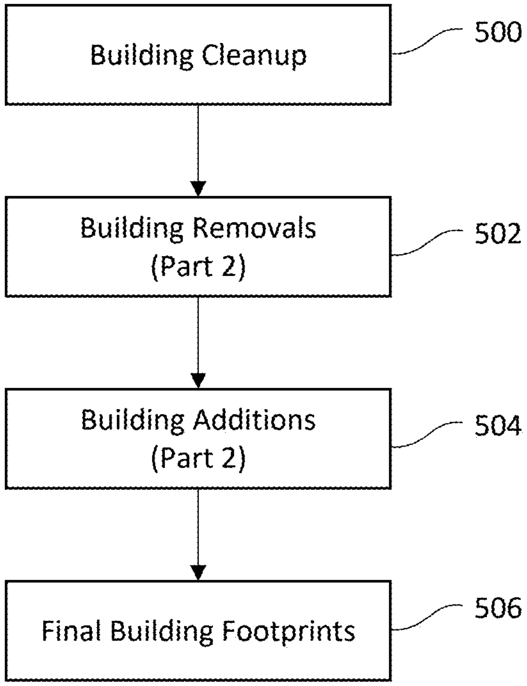
FIG. 5 is a flowchart of an exemplary method for a subsequent post-processing after the initial post-processing in order to generate the final building footprints for graphical output.

In step 314, the building analysis system 102 implements a final or subsequent post-processing algorithm, which will now be described and illustrated in more detail. Referring to FIG. 5 is a flowchart of an exemplary method for a subsequent post-processing after the initial post-processing to generate the final building footprints for graphical output is illustrated. In step 500 in this example, the building analysis system 102 performs building outline cleanup operations to simplify and improve the graphical presentation of the building outlines, such as by making one or more portions of one or more of the building outlines straighter and/or include sharper corners, for example.

In some examples, one or more of the building outlines comprises a polygon and the building analysis system 102 is configured to apply a simplification algorithm to one or more portions of the polygon. In some of these examples, at least one of the portions of the polygon corresponds to a portion of a building determined during the initial overhead imagery analysis to be blocked by vegetation overhang. The projected or estimated segment(s) of a building outline tend to be less precise or straight, for example, and therefore the applied simplification algorithm can improve the presentation of those segment(s). In one particular example, the polygon associated with a building outline can be simplified by applying a Douglas-Peucker algorithm, although other types of simplification algorithms can also be applied in step 500.

In steps 502 and 504, the building analysis system 102 modifies one or more of the building outlines based on one or more property features detected based on an application of one or more of the deep learning classifiers (e.g., trained machine learning classifiers) obtained in step 312 to the overhead images. Specifically, the building analysis system 102 determines based on the property features whether to retain, expand, and/or contract one or more portions of one or more of the building outlines. In some examples, the property features include yard debris or structural damage.

In one particular example, the deep learning classifier can be trained to identify yard debris in an overhead image. If the application of the deep learning classifier results in identification of yard debris for a property, an associated building having an outline present within the footprint data obtained from the footprint sever 114 was likely destroyed. In this example, the building outline generated for the associated building will not be removed in step 502 as the associated information may be relevant for an insurance carrier or other downstream user of the building footprints. Thus, the deep learning classifiers advantageously facilitate distinguishing between buildings that were removed and buildings that were destroyed by natural disasters, such as hurricanes or wildfires.

In step 506, the building analysis system 102 generates the final building footprints for each of the building(s) represented in the overheard imagery obtained in step 304. The final building footprints result from the application of the initial post-processing algorithm in step 308 and the subsequent post-processing algorithm in step 310.

Referring back to FIG. 3, in step 316, the building analysis system 102 outputs at least a portion of at least one of the obtained overhead images with a graphical overlay comprising the building outline via a user interface in response to the request received in step 300. Thus, the building analysis system 102 outputs at least a portion of at least one of the overhead images with an overlay corresponding to a building outline or footprint for one or more buildings associated with the property via a user interface provided to one of the user devices 106(1)-106(*n*) in response to the footprint request received as described above with reference to step 300 of FIG. 3, for example.

Optionally, the interface output in step 316 can be configured to receive feedback data to indicate an accuracy of the estimated building footprint(s), which can be used to continuously retrain the initial and/or subsequent algorithm or a portion thereof. Also optionally, the interface can include additional data and information determined by the building analysis system 102. For example, the interface can include a graphical indication of detected yard and/or roof debris that is appropriately labeled. Other types of information can also be provided to one of the user devices 106(1)-106(*n*) in step 316. Additionally, one or more of steps 300-316 can be performed in a different order and/or in parallel for any number of the user devices 106(1)-106(*n*) and for any number of properties.

Accordingly, as described and illustrated by way of the examples herein, this technology advantageously leverages algorithms for initial building outline generation, property shift, building shift and rotations, wall sliding, and final post-processing to enhance building footprint quality. The technology described and illustrated herein reduces or eliminates manual post-processing, enhances accuracy and consistency, and provides a highly adaptable and scalable solution that can work with or without building footprint data obtained from a footprint server 114. Additionally, the disclosed technology effectively accounts for building modifications, additions, and removals to account for structural changes that may have occurred on the property and ensure that resulting interface outputs are up-to-date and relevant, particularly in rapidly changing urban landscapes, without requiring reliance on historical data that may be outdated or inconsistent with the current overhead imagery.

This technology employs advanced refinement algorithms, which are effective regardless of the source of the overhead imagery or building footprint data, to provide consistent building footprint quality across different regions and properties. For example, this technology can handle a broad range of image resolutions, facilitating effectiveness in both rural and urban regions that often have different imagery resolutions available. The building footprints generated by this technology are visually appealing, more realistic, and accurately represent the straight edges of building structures. The enhanced visual representation facilitated by this technology can greatly benefit various applications and industries, such as property and casualty insurance, urban planning, infrastructure development, emergency response planning, environmental impact assessments, property management, and real estate development.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

Aspects of the present technical solutions are described herein with reference to flowchart illustrations and/or block diagrams of methods, apparatuses (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, the terms “worker,” “algorithm,” “system,” “module,” “engine,” or “architecture,” if used herein, are not intended to be limiting of any particular implementation for accomplishing and/or performing the actions, steps, processes, etc., attributable to and/or performed thereby. An algorithm, system, module, engine, and/or architecture may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular algorithm, system, module, and/or engine is, unless otherwise specified, for purposes of convenience of reference and not intended to be limiting to a specific implementation. Additionally, any functionality attributed to an algorithm, system, module, engine, and/or architecture may be equally performed by multiple algorithms, systems, modules, engines, and/or architectures incorporated into and/or combined with the functionality of another algorithm, system, module, engine, and/or architecture of the same or different type, or distributed across one or more algorithms, systems, modules, engines, and/or architectures of various configurations.

The flowchart and block diagrams in the figures illustrate the architecture, functionality, and operation of possible implementations of systems, methods, and computer program products according to various embodiments of the present technical solutions. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action can be said to be “in response to” a first action independent of whether the second action results directly or indirectly from the first action. The second action can occur at a substantially later time than the first action and still be in response to the first action. Similarly, the second action can be said to be in response to the first action even if intervening actions take place between the first action and the second action, and even if one or more of the intervening actions directly cause the second action to be performed. For example, a second action can be in response to a first action if the first action sets a flag and a third action later initiates the second action whenever the flag is set.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method implemented by a building analysis system, comprising:

analyzing an overhead image with a first trained machine learning classifier to generate a first building outline for a first building associated with a property represented by the overhead image, wherein the overhead image is included in imagery data obtained from an overhead imagery server based on a received request comprising a geographic location for the property;

shifting or rotating the first building outline;

thereafter sliding one or more segments of the first building outline to match one or more identified walls of the first building, wherein each slid segment is shifted and/or rotated to more closely align with one or more corresponding walls of the first building identified during the analysis of the overhead image;

modifying the first building outline based on one or more property features detected based on an application of a second trained machine learning classifier to the overhead image; and outputting at least a portion of the overhead image with a graphical overlay comprising the first building outline via a user interface in response to the received request.

2. The method of claim 1, further comprising shifting or rotating the overhead image based on a determined centroid of each of the first building outline and a second building outline obtained for the first building from a footprint server based on the geographic location.

3. The method of claim 2, further comprising generating the first building outline to have a shape and a location within the overhead image, wherein the shape is determined based on another shape of the second building outline and the location is determined based on pixels of the overhead image determined to correspond to the first building based on the analysis of the overhead image.

4. The method of claim 2, further comprising one or more of shifting or rotating the first building outline to a location within the overhead image that results in a maximum intersection over-union value determined based on the first and second building outlines.

5. The method of claim 1, further comprising:

analyzing the overhead image to identify locations of multiple buildings;

obtaining multiple building outlines associated with the property from a footprint server based on the geographic location; and determining whether to generate the first building outline using one of the building outlines based on a comparison of the building outlines to the locations of the buildings within the overhead image.

6. The method of claim 1, further comprising analyzing the overhead image to generate a second building outline for a second building associated with the property, wherein the shifting or rotating of the first building outline is independent of the second building outline.

7. The method of claim 1, further comprising determining based on the property features whether to retain the first building outline, wherein the property features comprise yard debris or structural damage.

8. The method of claim 1, further comprising generating the first building outline based in part on an estimation of a location of a portion of the first building determined to be blocked by vegetation overhang based on the analysis of the overhead image.

9. The method of claim 8, wherein the first building outline comprises a polygon and the method further comprises applying a simplification algorithm to one or more portions of the polygon before outputting the portion of the overhead image with the graphical overlay comprising the first building outline, wherein at least one of the portions of the polygon corresponds to the portion of the first building determined to be blocked by vegetation overhang.

10. A building analysis system, comprising memory having instructions stored thereon and one or more processors coupled to the memory and configured to execute the stored instructions to:

analyze an overhead image with a first trained machine learning classifier to generate a first building outline for a first building associated with a property represented by the overhead image, wherein the overhead image is included in imagery data obtained from an overhead imagery server based on a received request comprising a geographic location for the property;

shift or rotate the first building outline based on a determined centroid of each of the first building outline and a second building outline obtained for the first building from a footprint server based on the geographic location, wherein the first building outline is shifted or rotated independent of a third building outline for a third building associated with the property and obtained from the footprint server based on the geographic location;

thereafter slide one or more segments of the first building outline to match one or more walls of the first building identified during the analysis of the overhead image, wherein each slid segment is shifted and/or rotated to more closely align with one or more corresponding walls of the first building;

modify the first building outline based on one or more property features detected based on an application of a second trained machine learning classifier to the overhead image; and output at least a portion of the overhead image with a graphical overlay comprising at least the first building outline via a user interface in response to the received request.

11. The building analysis system of claim 10, wherein the processors are further configured to execute the stored instructions to generate the first building outline to have a shape and a location within the overhead image, wherein the shape is determined based on another shape of the second building outline and the location is determined based on pixels of the overhead image determined to correspond to the first building based on the analysis of the overhead image.

12. The building analysis system of claim 10, wherein the processors are further configured to execute the stored instructions to one or more of shift or rotate the first building outline to a location within the overhead image determined based on an intersection-over-union value generated based on the first and second building outlines.

13. The building analysis system of claim 10, wherein the processors are further configured to execute the stored instructions to determine based on the property features whether to include the first building outline in, or exclude the first building outline from, the graphical overlay, wherein the property features comprise yard debris or structural damage.

14. The building analysis system of claim 10, wherein the processors are further configured to execute the stored instructions to generate the first building outline based in part on an estimation of a location of a portion of the first building determined to be blocked by vegetation overhang based on the analysis of the overhead image.

15. The building analysis system of claim 14, wherein the processors are further configured to execute the stored instructions to simplify one or more portions of the first building outline before outputting the portion of the overhead image with the graphical overlay comprising the first building outline, wherein at least one of the portions of the first building outline corresponds to the portion of the first building determined to be blocked by vegetation overhang.

16. A non-transitory computer readable medium having stored thereon instructions comprising executable code that, when executed by one or more processors, causes the processors to:

analyze an overhead image to generate a first building outline for a first building associated with a property represented by the overhead image, wherein the overhead image is included in imagery data obtained from an overhead imagery server based on a received request comprising a geographic location for the property;

obtaining a second building outline for the first building and a third building outline for a second building associated with the property from a footprint server based on the geographic location;

adjust the first building outline based in part on the second building outline and independent of the third building outline;

thereafter modify a position of one or more segments of the first building outline to match one or more walls of the first building identified during the analysis of the overhead image, wherein each modified segment is shifted and/or rotated to more closely align with one or more corresponding walls of the first building; and output the overhead image with a graphical overlay comprising at least the first building outline via a user interface in response to the received request.

17. The non-transitory computer readable medium of claim 16, wherein the executable code, when executed by the processors, further causes the processors to generate the first building outline to have a shape and a location within the overhead image, wherein the shape is determined based on another shape of the second building outline and the location is determined based on pixels of the overhead image determined to correspond to the first building based on the analysis of the overhead image.

18. The non-transitory computer readable medium of claim 16, wherein the executable code, when executed by the processors, further causes the processors to modify the first building outline based on one or more property features detected based on an application of one or more trained machine learning classifiers to the overhead image before the overhead image is output.

19. The non-transitory computer readable medium of claim 18, wherein the executable code, when executed by the processors, further causes the processors to determine based on the property features whether to retain the first building outline.

20. The non-transitory computer readable medium of claim 18, wherein the executable code, when executed by the processors, further causes the processors to determine based on the property features whether to include the first building outline in, or exclude the first building outline from, the graphical overlay.

* * * * *